US012356176B2

(12) United States Patent
Miwa et al.

(10) Patent No.: US 12,356,176 B2
(45) Date of Patent: Jul. 8, 2025

(54) SOUND PROCESSING METHOD, SOUND PROCESSING APPARATUS, AND NON-TRANSITORY COMPUTER-READABLE STORAGE MEDIUM STORING SOUND PROCESSING PROGRAM

(71) Applicant: Yamaha Corporation, Hamamatsu (JP)

(72) Inventors: Akihiro Miwa, Kosai (JP); Kenichi Tanaka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 347 days.

(21) Appl. No.: 17/990,853

(22) Filed: Nov. 21, 2022

(65) Prior Publication Data

US 2023/0082731 A1 Mar. 16, 2023

Related U.S. Application Data

(63) Continuation of application No. PCT/JP2021/019295, filed on May 21, 2021.

(30) Foreign Application Priority Data

May 25, 2020 (JP) ................. 2020-090333

(51) Int. Cl.
H04S 7/00 (2006.01)
G06T 7/73 (2017.01)
G06T 11/00 (2006.01)
(52) U.S. Cl.
CPC .............. H04S 7/302 (2013.01); G06T 7/73 (2017.01); G06T 11/00 (2013.01); H04S 2400/11 (2013.01)

(58) Field of Classification Search
CPC ........ H04S 7/302; H04S 2400/11; G06T 7/73; G06T 11/00
USPC ........................................ 381/310
See application file for complete search history.

(56) References Cited

U.S. PATENT DOCUMENTS

| 5,027,689 A | 7/1991 | Fujimori |
| 2010/0232635 A1 | 9/2010 | Miyazaki et al. |
| 2014/0270320 A1* | 9/2014 | O'Polka ................. H04R 1/323 381/386 |
| 2022/0141589 A1* | 5/2022 | O'Polka ................. G10K 11/28 381/304 |

FOREIGN PATENT DOCUMENTS

| JP | 3089421 B2 | 9/2000 |
| JP | 2007-26222 A | 2/2007 |
| JP | 2020-17880 A | 1/2020 |

OTHER PUBLICATIONS

Japanese-language Office Action issued in Japanese Application No. 2020-090333 dated Mar. 12, 2024 with English translation (6 pages).

(Continued)

Primary Examiner — Sean H Nguyen
(74) Attorney, Agent, or Firm — Crowell & Moring LLP

(57) ABSTRACT

A sound processing method includes obtaining an image of an acoustic space, setting a plane in the acoustic space using the image, setting a virtual speaker in the image of the acoustic space, calculating sound pressure distribution to the plane using characteristics of the virtual speaker, and overlapping the sound pressure distribution and the image of the plane.

16 Claims, 11 Drawing Sheets

(56) References Cited

OTHER PUBLICATIONS

Japanese-language Office Action issued in Japanese Application No. 2020-090333 dated Aug. 20, 2024 with English translation (7 pages).
International Search Report (PCT/ISA/210) issued in PCT Application No. PCT/JP2021/019295 dated Aug. 3, 2021 with English translation (four (4) pages).
Japanese-language Written Opinion (PCT/ISA/237) issued in PCT Application No. PCT/JP2021/019295 dated Aug. 3, 2021 (three (3) pages).
English translation of document C2 (Japanese-language Written Opinion (PCT/ISA/237), filed on Nov. 21, 2022) issued in PCT Application No. PCT/JP2021/019295 dated Aug. 3, 2021 (three (3(pages).

\* cited by examiner

SOUND PROCESSING METHOD, SOUND PROCESSING APPARATUS, AND NON-TRANSITORY COMPUTER-READABLE STORAGE MEDIUM STORING SOUND PROCESSING PROGRAM

CROSS REFERENCE TO RELATED APPLICATIONS

The present application is a continuation application of International Patent Application No. PCT/JP2021/019295, filed on May 21, 2021, which claims priority to Japanese Patent Application No. 2020-090333, filed on May 25, 2020. The contents of these applications are incorporated herein by reference in their entirety.

BACKGROUND

Technical Field

An embodiment of the present disclosure relates to a technology to see an acoustic image of a space.

Background Information

A sound adjustment device disclosed in Japanese Unexamined Patent Application Publication No. 2020-017880 is installed in a sound field of which the volume level is desired to be measured. The sound adjustment device detects and stores an output volume level of a speaker.

The sound adjustment device shows in a graph the output volume level of a designated listening position in the sound field. The sound adjustment device displays the graph as a two-dimensional image.

However, the sound adjustment device disclosed in Japanese Unexamined Patent Application Publication No. 2020-017880 installs an actual speaker in a space and detects the output level of the speaker. Therefore, a conventional device such as the sound adjustment device disclosed in Japanese Unexamined Patent Application Publication No. 2020-017880 is not able to output an acoustic image of a sound pressure distribution or the like when a desired speaker is placed in a space such as a room in which a speaker has not yet been placed.

SUMMARY

In view of the foregoing, an object of the present disclosure is to provide a user with an acoustic image of such a space when a desired speaker is placed in a space in which a speaker has not yet been placed, even when a speaker is not actually placed.

The sound processing method obtains an image of an acoustic space, sets a plane in the acoustic space from the image, sets a virtual speaker in the image of the acoustic space, calculates sound pressure distribution to the plane, from characteristics of the virtual speaker, and generates a composite image by superimposing an image showing the sound pressure distribution and an image of the plane.

The sound processing method is able to provide a user with an acoustic image when a desired speaker is placed in a space in which a speaker has not yet been placed, even when a speaker is not actually placed.

DETAILED DESCRIPTION

[Hardware Configuration of Sound Processing Apparatus]

Figure 1:
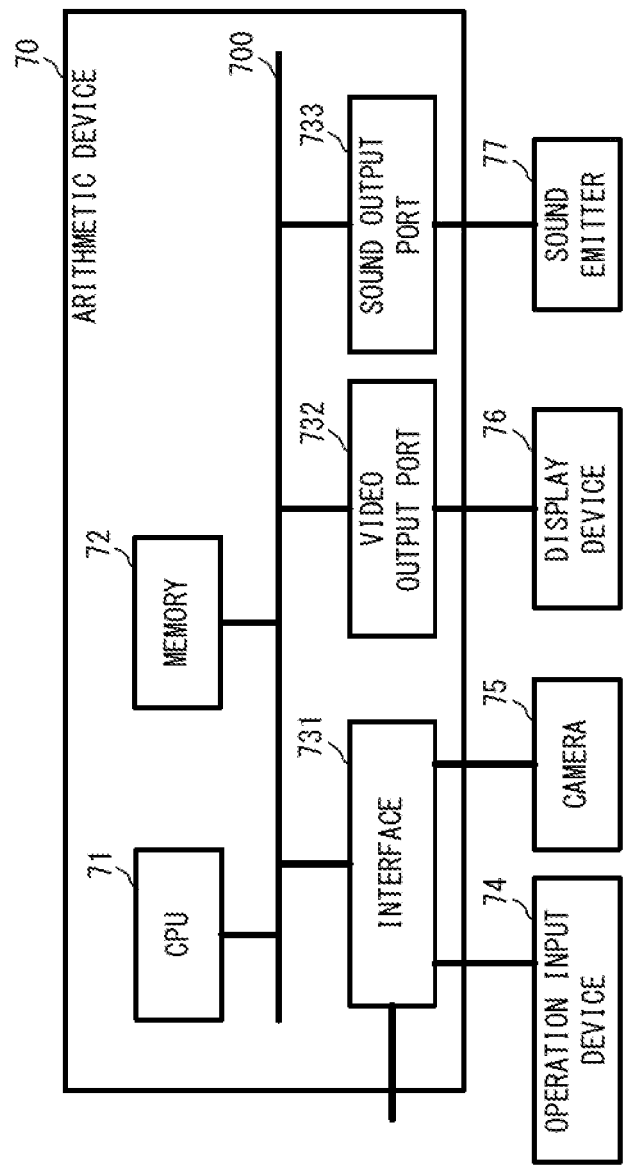
FIG. 1 is a diagram showing an example of a hardware configuration of a sound processing apparatus.

FIG. 1 is a diagram showing an example of a hardware configuration of a sound processing apparatus. As shown in FIG. 1, the sound processing apparatus 10 includes an arithmetic device 70 such as a computer, as a hardware configuration. The arithmetic device 70 includes a CPU 71, a memory 72, an interface 731, a video output port 732, a sound output port 733, and a bus 700. The bus 700 connects the CPU 71, the memory 72, the interface 731, the video output port 732, and the sound output port 733.

The memory 72 stores various programs, data, and the like for operating each part of the sound processing apparatus. The CPU 71 executes the various programs stored in the memory 72 and achieves the sound processing apparatus. Not only does the memory 72 store the various programs and data but also may an external storage to be connected through the interface 731 or a server or the like connected to a network store the various programs and data. In such a case, the CPU 71 reads the various programs and data from the server or the like, through the interface 731.

The interface 731 executes data communication to the operation input device 74 and the camera 75. In addition, the interface 731 executes control of communication not only with the operation input device 74 and the camera 75, but also with the various external apparatuses to be connected to the arithmetic device 70 or with an external network.

The operation input device 74 is, for example, a touch panel or the like. The operation input device 74 outputs instruction data or the like according to a received operation, to the CPU 71 through the interface 731. The instruction data is data indicating start instructions of the composite image of sound pressure distribution, instructions of a placement position of the virtual speaker, or similar instructions, for example. The camera 75 outputs a captured image data to the CPU 71, through the interface 731.

The video output port 732 is connected to the display device 76. The arithmetic device 70, that is, the sound processing apparatus outputs image data (composite image data to be described below) including sound pressure distribution, to the display device 76, through the video output port 732. It is to be noted that, in a case in which the sound processing apparatus does not output the image data including sound pressure distribution, the video output port 732 and the display device 76 are able to be omitted.

The sound output port 733 is connected to a sound emitter 77. The sound emitter 77 is, for example, a headphone speaker, an installed type stereo speaker, or the like. The arithmetic device 70, that is, the sound processing apparatus outputs a predicted listening sound to the sound emitter 77. The predicted listening sound is a sound calculated as what is emitted from the virtual speaker to a desired position. It is to be noted that, in a case in which the sound processing apparatus does not output the predicted listening sound, the sound output port 733 and the sound emitter 77 are able to be omitted.

First Embodiment (Functional Configuration of Sound Processing Apparatus)

Figure 2:
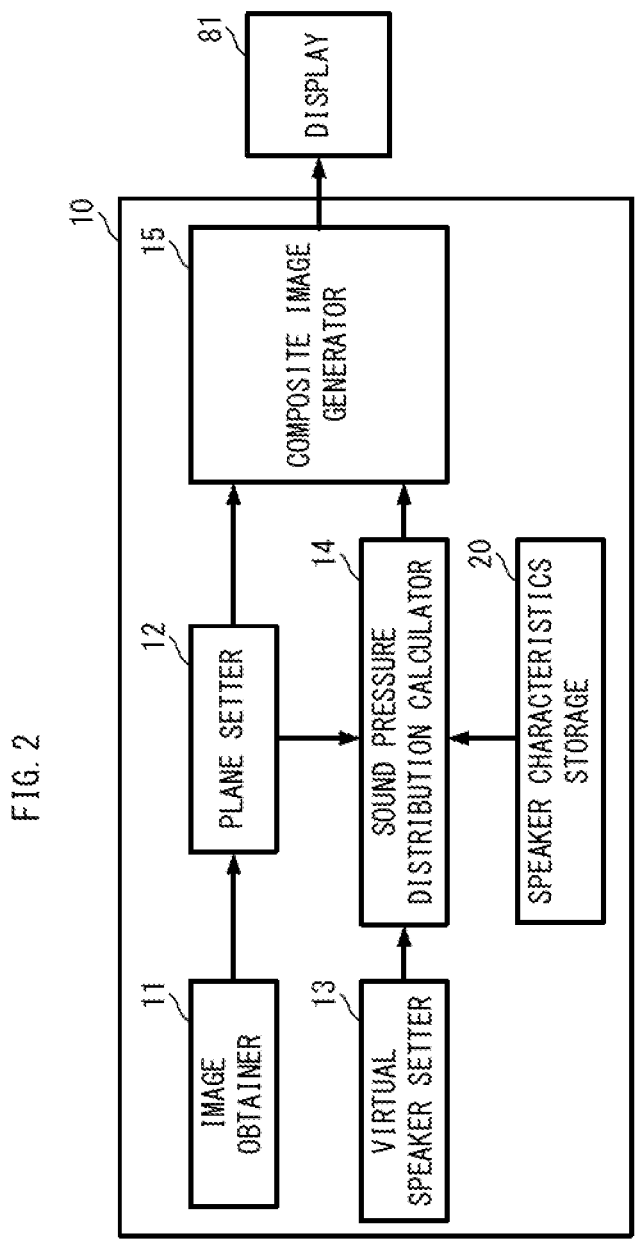
FIG. 2 is a functional block diagram showing a configuration of the sound processing apparatus according to a first embodiment of the present disclosure.
Figure 3A:
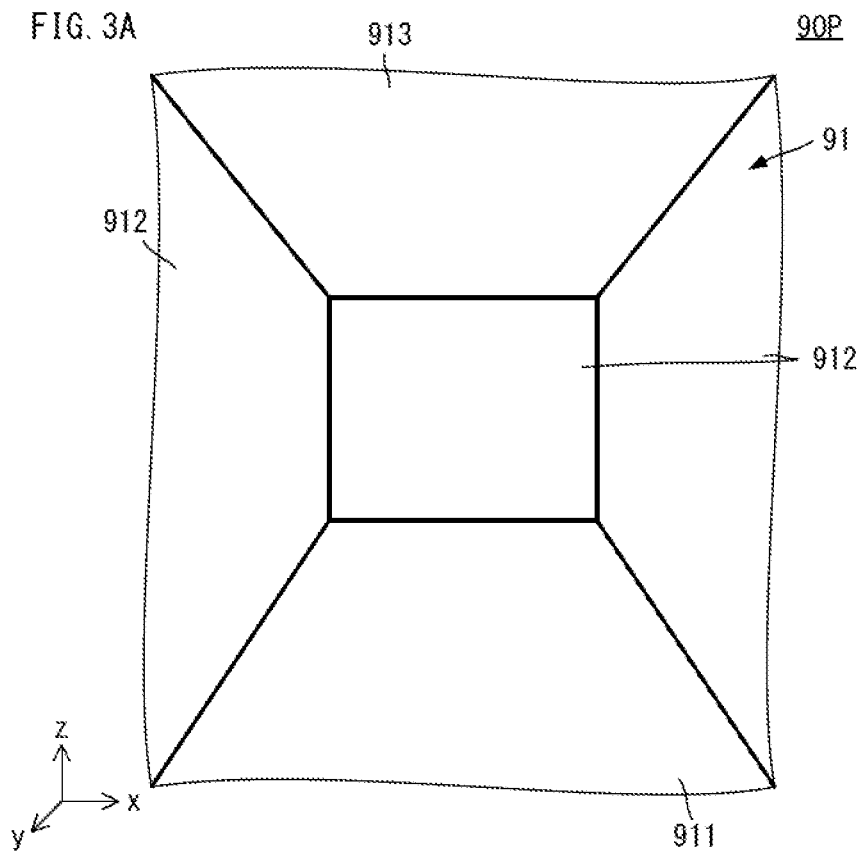
FIG. 3A is a view showing an example of a pre-combined image of a virtual speaker and sound pressure distribution.
Figure 3B:
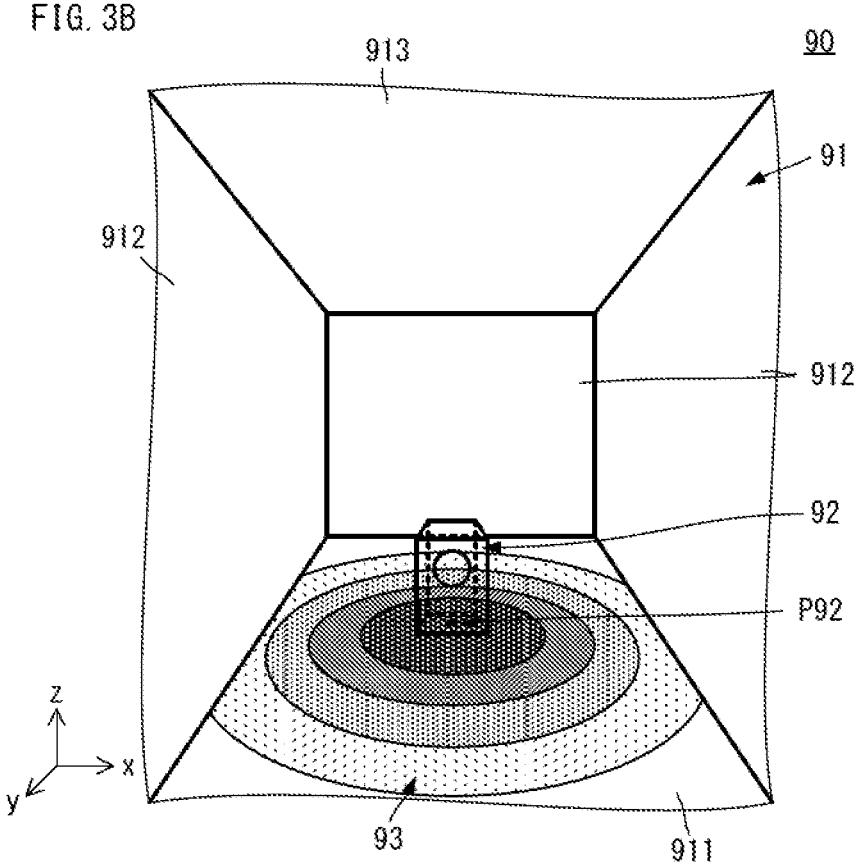
FIG. 3B is a view showing an example of a post-combined image of a virtual speaker and sound pressure distribution.

FIG. 2 is a functional block diagram showing a configuration of the sound processing apparatus according to a first embodiment of the present disclosure. FIG. 3A is a view showing an example of a pre-combined image of a virtual speaker and sound pressure distribution, and FIG. 3B is a view showing an example of a post-combined image of a virtual speaker and sound pressure distribution.

As shown in FIG. 2, the sound processing apparatus 10 includes an image obtainer 11, a plane setter 12, a virtual speaker setter 13, a sound pressure distribution calculator 14, a composite image generator 15, and a speaker characteristics storage 20.

The image obtainer 11 obtains an image of a space (an "acoustic space" of the present disclosure) in which sound pressure distribution is calculated, from the camera 75 (see FIG. 3A). For example, the image obtainer 11 obtains an image 90P of a room 91 in which sound pressure distribution is calculated. The image obtainer 11 outputs the image 90P to the plane setter 12.

The plane setter 12 sets a plane to which the sound pressure distribution is calculated, from the image 90P. For example, the plane setter 12 sets a floor surface 911 in the room 91, from the image 90P. It is to be noted that, the plane setter 12, by various methods to be described below specifically, is able to set a plane to which sound pressure distribution is calculated, that is, the floor surface 911 as a specific example. At this time, the plane setter 12 sets x-y coordinates on the floor surface 911, for example. The plane setter 12 outputs the x-y coordinates of the floor surface 911, with an image, to the composite image generator 15.

The virtual speaker setter 13 sets a position and type of the virtual speaker. The position of the virtual speaker is set by designating a placement position of the virtual speaker in a displayed image. Designation of the placement position is achieved, for example, by an operation input by the operation input device 74.

The virtual speaker setter 13 sets the position of the virtual speaker 92, for example, by using the x-y coordinates that have been set on the floor surface 911. In addition, the virtual speaker setter 13 is able to set a front direction of the virtual speaker 92, for example, by the designation by the operation input device 74.

The type of the virtual speaker 92 is set, for example, by displaying an image (a window) or the like to select a type of a virtual speaker and designating a type. Designation of the type is achieved, for example, by an operation input by the operation input device 74.

The virtual speaker setter 13 outputs the position P92 of the virtual speaker, and the type of the virtual speaker, to the sound pressure distribution calculator 14.

The speaker characteristics storage 20 stores speaker characteristics for each type of a virtual speaker. The speaker characteristics are configured by frequency characteristics over the entire periphery (360 degrees) centering on a speaker. More specifically, the entire periphery (360 degrees) is decomposed by predetermined angle resolution to set a plurality of angles. Then, the frequency characteristics are set to each of the plurality of angles. The speaker characteristics are configured by the frequency characteristics that have been set to each of the plurality of angles. The speaker characteristics may be WAV data (time waveform) showing frequency characteristics or may be a frequency spectrum.

The sound pressure distribution calculator 14 obtains the speaker characteristics of a designated virtual speaker from the speaker characteristics storage 20.

The sound pressure distribution calculator 14 calculates sound pressure at a plurality of positions on the floor surface 911, by using the speaker characteristics and the position P92 of the virtual speaker. The sound pressure is sound pressure of a direct sound.

Figure 4:
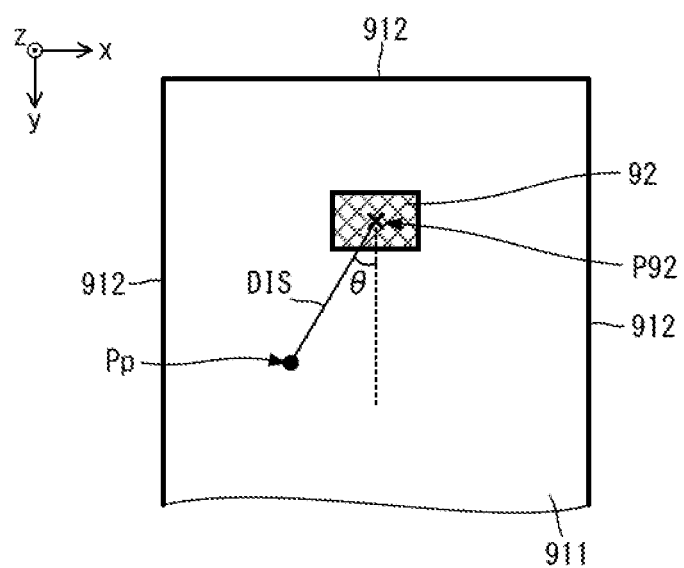
FIG. 4 is a schematic plan view of a space in which the virtual speaker is set.

FIG. 4 is a schematic plan view of a space in which the virtual speaker is set. More specifically, the sound pressure distribution calculator 14 sets a calculation position Pp of the sound pressure, on the floor surface 911. The sound pressure distribution calculator 14 calculates a distance DIS between the calculation position Pp of sound pressure and the position P92 of the virtual speaker. In addition, the sound pressure distribution calculator 14 calculates an azimuth angle θ of the calculation position Pp of sound pressure by using the position P92 of the virtual speaker as a reference point. The sound pressure distribution calculator 14, for example, as shown in FIG. 4, sets the azimuth angle θ (an angle in -x direction of FIG. 4) by an angle proceeding counterclockwise, when the floor surface 911 is viewed in front view, assuming that the front direction of the virtual speaker is the azimuth angle θ=0.

It is to be noted that the method of setting the azimuth angle θ is not limited to this example. In addition, herein, the reference point is set at the center when the virtual speaker 92 is viewed in a plan view. However, the position of the reference point to the virtual speaker 92 changes depending on the shape of a speaker used as a model of the virtual speaker 92. For example, the reference point may be set at the position in front of the virtual speaker 92 or the reference point may be set at the position in back of the virtual speaker 92. Furthermore, in a case in which the speaker used as the model of the virtual speaker 92 is of a type that reflects a sound onto the ceiling 913 or the wall 912, the position of this reflection point becomes a position of the reference point. It is to be noted that the setting of the reference point is not limited to these examples, and the reference point is able to be appropriately set by the model of the virtual speaker 92, the shape of a speaker, or the like.

The sound pressure distribution calculator 14 extracts a component of the azimuth angle θ in the speaker characteristics, from the azimuth angle θ. As a result, the sound pressure distribution calculator 14, to a virtual speaker, is able to calculate sound pressure (reference sound pressure) in the direction of the azimuth angle θ and at a distance of 1 m.

The sound pressure distribution calculator 14 performs a correction in a distance direction, to the reference sound pressure, by using the distance DIS. More specifically, the sound pressure distribution calculator 14 performs a correction such that sound pressure attenuates inversely proportional to the square of the distance by using a sound ray tracing method. In other words, the sound pressure distribution calculator 14 calculates k·(reference sound pressure)/$(DIS)^2$. It is to be noted that k is a coefficient, may be basically "1," and is able to be adjusted by temperature or humidity. As a result, the sound pressure distribution calculator 14 is able to calculate sound pressure by adding the influence of absorption of sound energy by air.

The sound pressure distribution calculator 14 performs such processing of calculating sound pressure, to a plurality of positions set on the floor surface 911. For example, the sound pressure distribution calculator 14 performs the processing of calculating sound pressure, on the entire floor surface 911 or in a desired range on the floor surface 911. It is to be noted that designation of the desired range is able to be achieved by an operation input by the operation input device 74, for example.

The sound pressure distribution calculator 14 outputs the sound pressure calculated at the plurality of positions, that is, sound pressure distribution, to the composite image generator 15. At this time, the sound pressure distribution calculator 14 outputs the sound pressure distribution associated with the x-y coordinates.

The composite image generator 15 combines the virtual speaker 92 and the sound pressure distribution (an image showing the sound pressure distribution) 93 in the image 90P, and generates the composite image 90 as shown in FIG. 3B. At this time, the composite image generator 15 causes the x-y coordinates associated with the image 90P, the x-y coordinates associated with the virtual speaker 92, and the x-y coordinates associated with the sound pressure distribution 93 to coincide with each other, and combines the virtual speaker 92 and the sound pressure distribution 93 in the image 90P. The composite image generator 15 outputs the composite image 90 to the display 81 (the display device 76 of FIG. 1 or other display devices, for example). The display 81 displays the composite image 90. It is to be noted that the display 81 may be included in the audio signal processing apparatus 10.

As a result, as shown in FIG. 3B, the composite image 90 is an image in which the sound pressure distribution 93 according to a position of the virtual speaker 92 placed at a designated position in the image 90P (the image of the room 91) of the space is superimposed on the floor surface 911. Accordingly, even when a real speaker is not actually placed, a user installs the virtual speaker 92 corresponding to the real speaker, and can visually grasp the sound pressure of the space. Herein, as shown in hatching of FIG. 3B, the sound pressure distribution 93 is shown as an image from which a display mode varies according to the magnitude of the sound pressure. As a result, the user can visually and more easily grasp the sound pressure of the space when the virtual speaker 92 is installed.

It is to be noted that, in the above description, the sound pressure distribution is calculated not only to a surface of the floor surface 911, that is, a plane at the position of zero in a z direction perpendicular to an x-y coordinate plane, but also to a plane of a predetermined height (a non-zero z coordinate value). In other words, the plane on which the sound pressure is calculated is also able to be set to the plane of a predetermined height from the floor surface 911. In such a case, the sound pressure distribution calculator 14, also taking the position of a z axis into consideration, may perform a distance correction of the sound pressure.

In addition, in the above description, the sound processing apparatus 10 calculates sound pressure distribution to one plane. However, the sound processing apparatus 10 is also able to calculate sound pressure distribution to each of a plurality of planes.

Figure 5:
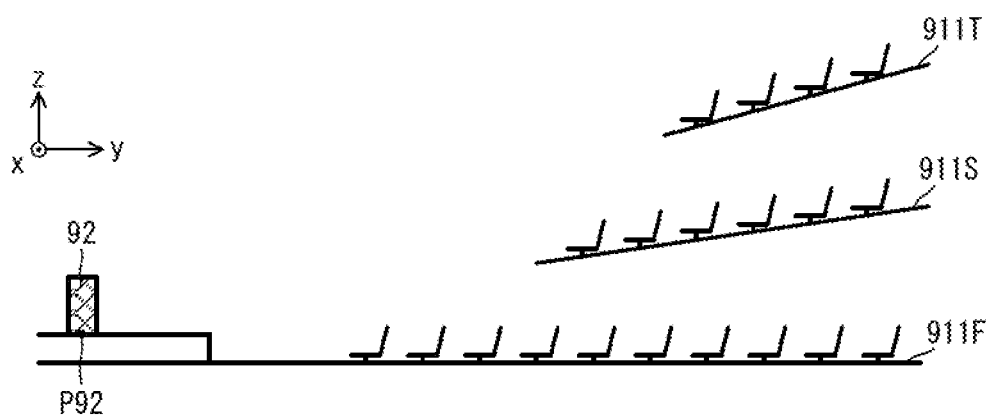
FIG. 5 is a view showing an example of an aspect in which the sound pressure distribution to a plurality of planes is calculated.

FIG. 5 is a view showing an example of an aspect in which the sound pressure distribution to the plurality of planes is calculated. As shown in FIG. 5, a concert hall or the like may include a plurality of floors such as a first floor seat, a second floor seat, and a third floor seat. In such a case, for example, as shown in FIG. 5, the sound processing apparatus 10 sets the first floor to a first floor surface 911F, the second floor to a second floor surface 911S, and the third floor to a third floor surface 911T. Then, the sound processing apparatus 10, by using the above method, calculates sound pressure distribution to each of the first floor surface 911F, the second floor surface 911S, and the third floor surface 911T.

In addition, the above configuration shows an aspect in which one virtual speaker 92 is disposed. However, the number of the virtual speakers 92 is not limited to only one and may be two or more. In such a case, the sound pressure distribution calculator 14 is able to calculate sound pressure at each position by adding the sound pressure from the plurality of virtual speakers 92, in a frequency domain.

In addition, the above sound processing apparatus 10 shows an aspect in which the sound pressure distribution of a direct sound is calculated. However, the sound processing apparatus 10 is able to calculate sound pressure distribution also including an indirect sound, using a setting parameter of an early reflected sound or a reverberant sound of the space (the room 91).

(Sound Processing Method (Method of Generating Composite Image))

Figure 6:
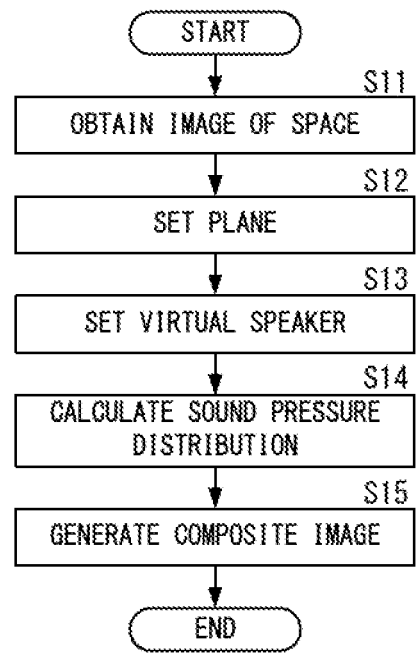
FIG. 6 is a flow chart showing how to combine the virtual speaker and the sound pressure distribution into an image of a space.

In the above description, a method of generating a composite image, more specifically, processing of superimposing the virtual speaker 92 and the sound pressure distribution on the image of the space (the room 91) is achieved by a plurality of functional parts. However, the arithmetic device 70 such as the above computer, in a case of executing a program and generating a composite image, may schematically execute processing shown in the flow chart of FIG. 6. FIG. 6 is a flow chart showing how to combine the virtual speaker and the sound pressure distribution into an image of a space. It is to be noted that, since the specific content of each processing is described above, only a schematic flow will be described herein.

The arithmetic device 70 obtains an image of a space mainly from a camera 75 (S11). The arithmetic device 70 sets a plane to the image of the space (S12). The arithmetic device 70 sets a virtual speaker 92 (S13).

The arithmetic device 70 calculates sound pressure distribution from the position of the virtual speaker 92 and the type (the speaker characteristics) of the virtual speaker 92 (S14). The arithmetic device 70 combines the virtual speaker 92 and the sound pressure distribution into the image of the space, and generates a composite image (S15).

(Specific Method of Setting Plane (Floor Surface 911 as Example) to which Sound Pressure Distribution is Calculated)

(A) The plane setter 12 labels each object reflected in the image 90P as a floor, a side wall, and a ceiling, from each feature. Then, the plane setter 12 sets a surface of the object labeled as a floor to the floor surface 911. At this time, the plane setter 12 may set a surface of an object to be connected to the object labeled as a side wall or a surface of an object that faces the object labeled as a ceiling, to the floor surface 911.

(B) The plane setter 12, assuming that the shape of the floor surface 911 is a rectangle, extracts a substantial rectangle that extends in the horizontal direction and the depth direction of the image 90P, from the image 90P. The plane setter 12 sets a plane of the substantial rectangle to the floor surface 911.

(C) A user has a movement detection device. The movement detection device detects movement of the own device. The user moves along an outer perimeter (a side surface) of the floor surface 911. The movement detection device detects the movement of the own device, and outputs a detection result to the plane setter 12. The plane setter 12 sets the floor surface 911 from the detection result. It is to be noted that the movement detection device may not detect continuous movement of the own device but may detect a position of the own device. In such a case, the user causes the movement detection device to detect the position at an apex (a corner) of the floor surface 911. The plane setter 12, for example, sets a region surrounded by each designated position, to the floor surface 911.

(D) The operation input device 74 receives designation of a position to the image 90P. A user designates a position of the apex (the corner) of the floor surface 911 by using the operation input device 74. The plane setter 12, for example, sets a region surrounded by each designated position, to the floor surface 911. Alternatively, the operation input device 74 receives designation of a region. The user designates a region of the floor surface 911 by using the operation input device 74. The plane setter 12 sets a designated region to the floor surface 911.

It is to be noted that detection of the floor surface 911 is also able to be performed, for example, by using a known image analysis in which a feature or the like of the floor surface 911 is extracted and used. In such a case, the user can set the floor surface 911, without separately designating the floor surface 911.

Second Embodiment (Functional Configuration of Sound Processing Apparatus)

Figure 7:
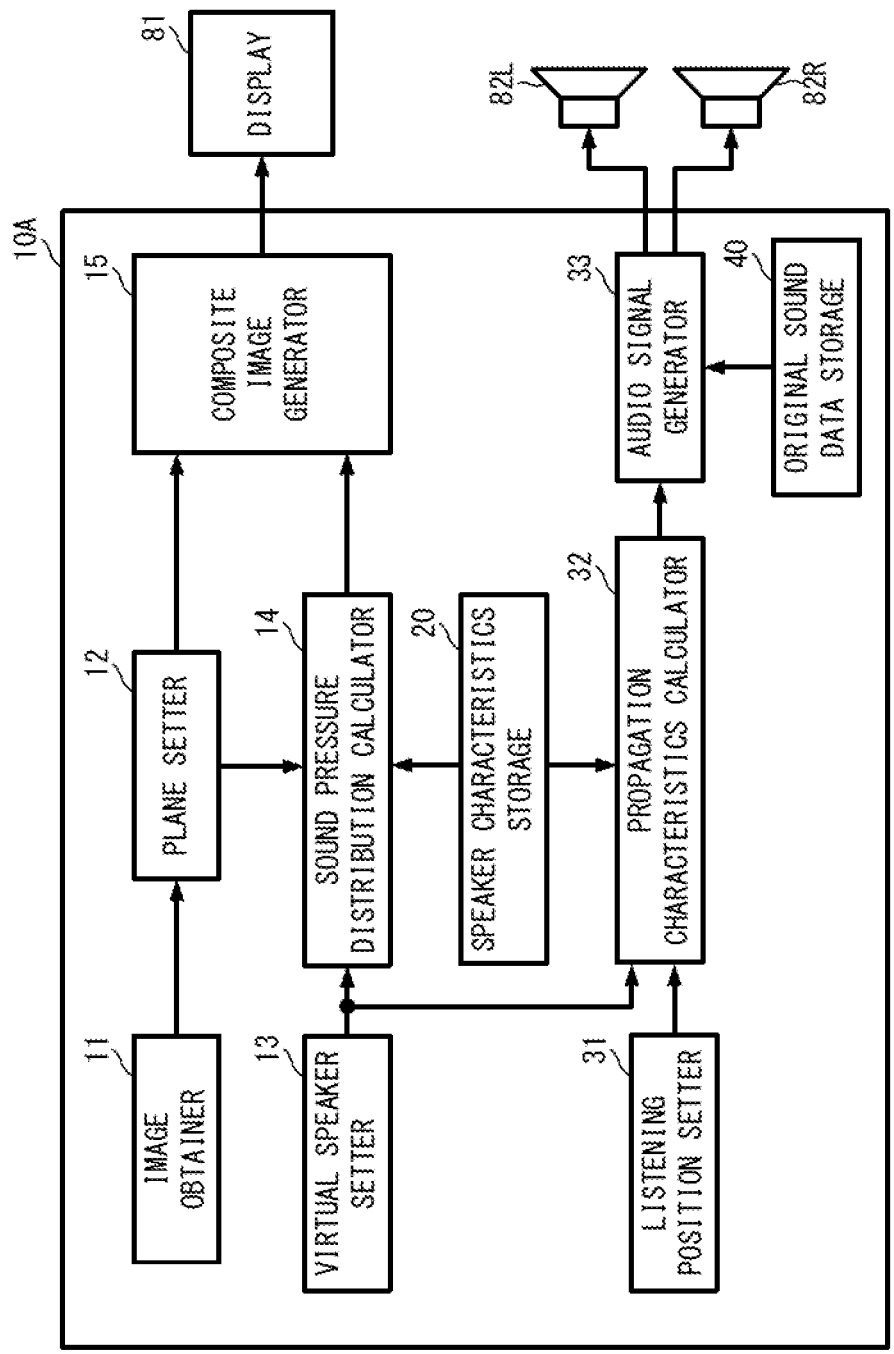
FIG. 7 is a functional block diagram showing a configuration of a sound processing apparatus according to a second embodiment of the present disclosure.
Figure 8:
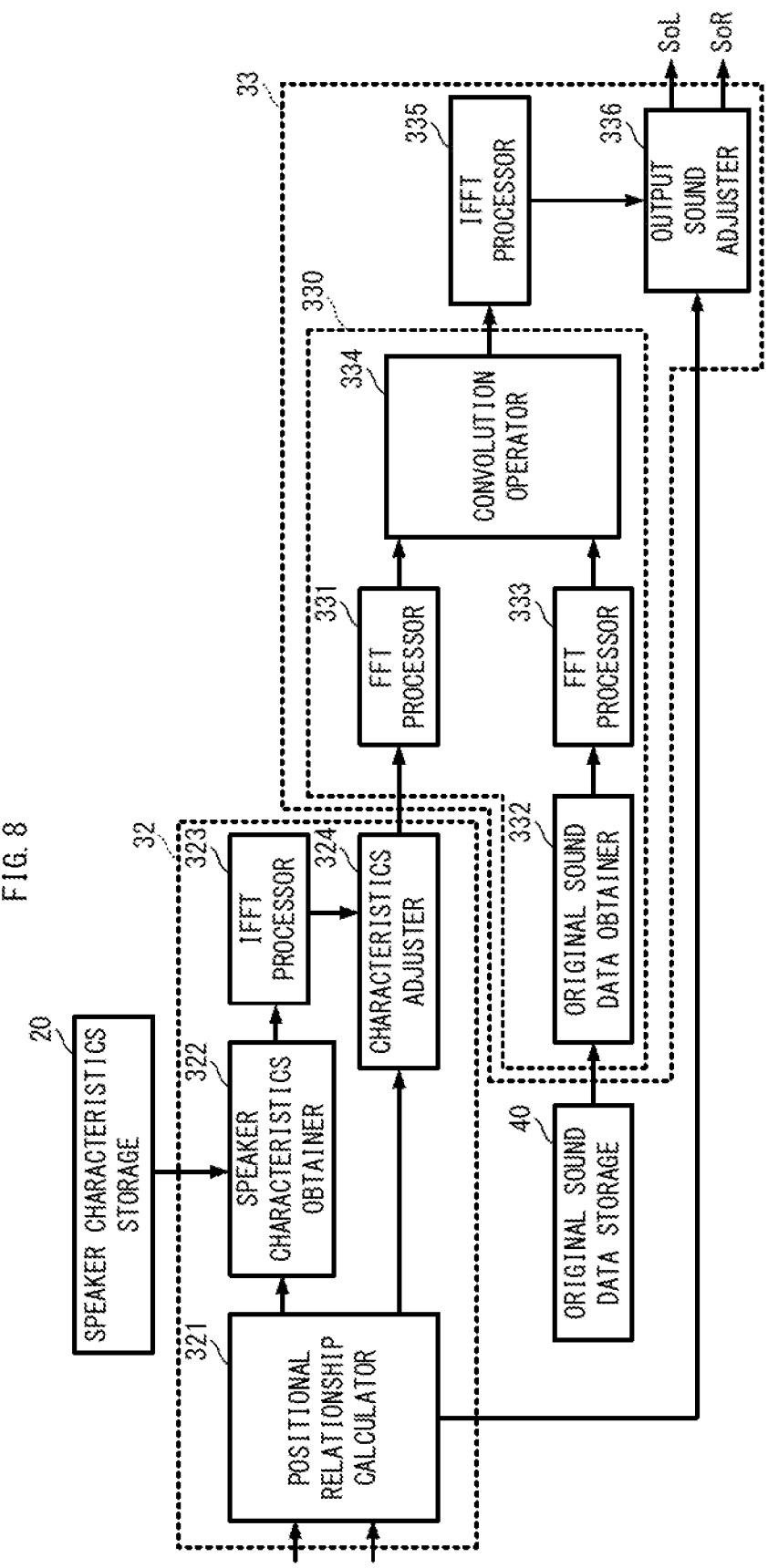
FIG. 8 is a functional block diagram showing a configuration of a reproduction part of a predicted listening sound of the sound processing apparatus according to the second embodiment.

FIG. 7 is a functional block diagram showing a configuration of a sound processing apparatus according to a second embodiment of the present disclosure. FIG. 8 is a functional block diagram showing a configuration of a reproduction part of a predicted listening sound of the sound processing apparatus according to the second embodiment.

As shown in FIG. 7, a sound processing apparatus 10A is different from the sound processing apparatus 10 in that a listening position setter 31, a propagation characteristics calculator 32, an audio signal generator 33, and an original sound data storage 40 are further included. Other configurations of the sound processing apparatus 10A are the same as or similar to the configurations of the sound processing apparatus 10, and a description of the same or similar configurations will be omitted.

The listening position setter 31 sets a listening position by designation of the listening position from the operation input device 74 to an image, for example. The listening position setter 31 sets the listening position by using x-y coordinates associated with a space. The listening position setter 31 outputs the listening position to the propagation characteristics calculator 32.

As shown in FIG. 8, the propagation characteristics calculator 32 includes a positional relationship calculator 321, a speaker characteristics obtainer 322, an IFFT processor 323, and a characteristics adjuster 324.

The positional relationship calculator 321, from the position of the virtual speaker 92 and the listening position, calculates a distance to the listening position on the basis of the position of the virtual speaker 92, and an azimuth angle of the listening position on the basis of the position of the virtual speaker 92. The positional relationship calculator 321 calculates the distance to the listening position and the azimuth angle of the listening position, similarly to a case of calculation of the above sound pressure distribution. The positional relationship calculator 321 outputs the azimuth angle to the speaker characteristics obtainer 322. The positional relationship calculator 321 outputs the distance to the characteristics adjuster 324.

The speaker characteristics obtainer 322 obtains the speaker characteristics of a set virtual speaker 92 from the speaker characteristics storage 20. The speaker characteristics obtainer 322 obtains a component (a desired azimuthal component) of a calculated azimuth angle in obtained speaker characteristics, as a frequency waveform (a frequency spectrum). The speaker characteristics obtainer 322 outputs the frequency waveform of the desired azimuthal component of the speaker characteristics, to the IFFT processor 323.

The IFFT processor 323, by performing inverse Fourier transform of the frequency spectrum of the desired azimuthal component of the speaker characteristics, generates impulse response data to the azimuth angle of the listening position. The IFFT processor 323 outputs the impulse response data to the characteristics adjuster 324.

The characteristics adjuster 324 corrects the attenuation over distance to the impulse response data by using the distance to the listening position. The characteristics adjuster 324, similarly to the above sound pressure distribution calculator 14, uses the sound ray tracing method and corrects the attenuation over distance to the impulse response data.

As a result, the propagation characteristics calculator 32 is able to calculate the impulse response data (the impulse response data at the listening position) that has been set according to the type of the virtual speaker 92 and the listening position on the basis of the position P92 of the virtual speaker 92. The propagation characteristics calculator 32 outputs the impulse response data at the listening position to the audio signal generator 33. The impulse response data correspond to the "propagation characteristics of a sound" of the present disclosure.

As shown in FIG. 8, the audio signal generator 33 includes an FFT processor 331, an original sound data obtainer 332, an FFT processor 333, a convolution operator 334, an IFFT processor 335, and an output sound adjuster 336. The FFT processor 331, the original sound data obtainer 332, the FFT processor 333, and the convolution operator 334 configure an audio data generator 330.

The FFT processor 331, by performing Fourier transform of the impulse response data at the listening position outputted from the characteristics adjuster 324 of the propagation characteristics calculator 32, generates the frequency waveform (the frequency spectrum) of the impulse response data at the listening position. The FFT processor 331 outputs the frequency waveform of the impulse response data at the listening position, to the convolution operator 334.

The original sound data obtainer 332 obtains original sound data to be made audible, from the original sound data storage 40. More specifically, the original sound data obtainer 332 receives a selection of the original sound data to be made audible, by designation using the operation input device 74, for example. The original sound data obtainer 332 obtains selected original sound data from the original sound data storage 40. It is to be noted that the original sound data storage 40 stores the original sound data as time waveform data such as WAV data, for example, and the original sound data obtainer 332 obtains the original sound data of the time waveform. The original sound data obtainer 332 outputs the original sound data to the FFT processor 333.

The FFT processor 333, by performing Fourier transform of the original sound data of the time waveform, generates the original sound data of the frequency waveform. The FFT processor 333 outputs the original sound data of the frequency waveform to the convolution operator 334. At this time, the FFT processor 333 may multiply the original sound data by a window function to perform FFT in a desired short time.

The convolution operator 334 performs convolution operation of the impulse response data at the listening position and the original sound data, generates predicted listening sound data of the frequency waveform, and outputs the predicted listening sound data to the IFFT processor 335.

The IFFT processor 335 performs inverse Fourier transform of the predicted listening sound data of the frequency waveform, and generates a predicted listening sound signal of the time waveform. The IFFT processor 335 outputs the predicted listening sound signal of the time waveform to the output sound adjuster 336.

As a result, the audio signal generator 33 is able to generate the predicted listening sound signal according to the listening position in the space, and the position P92 and type of the virtual speaker 92.

The output sound adjuster 336, from the predicted listening sound signal, generates a predicted listening sound signal SoL for an L channel, and a predicted listening sound signal SoR for an R channel. The output sound adjuster 336 outputs the predicted listening sound signal SoL for an L channel, to an L channel speaker 82L, and outputs the predicted listening sound signal SoR for an R channel, to an R channel speaker 82R. The L channel speaker 82L reproduces the predicted listening sound signal SoL for an L channel and emits a sound, and the R channel speaker 82R reproduces the predicted listening sound signal SoR for an R channel and emits a sound. A portion configured by the output sound adjuster 336, the L channel speaker 82L, and the R channel speaker 82R corresponds to a "sound emitter" of the present disclosure.

As a result, the user can virtually listen to a sound from a desired speaker placed in a desired position in a space, as if being present in such a space without actually placing the desired speaker.

Furthermore, the output sound adjuster 336 adjusts a level balance between the predicted listening sound signal SoL for an L channel and the predicted listening sound signal SoR for an R channel, by using the azimuth angle θ from the positional relationship calculator 321, that is, the direction of a listening position to the virtual speaker 92. As a result, the user can listen to the predicted listening sound from the virtual speaker 92 placed in the desired position in the space, with a more realistic sensation.

It is to be noted that, although the number of virtual speakers 92 is one in the example of the above sound processing apparatus 10A, the number of virtual speakers 92 may be two or more. In such a case, the sound processing apparatus 10A may combine and output the predicted listening sound signal from a plurality of virtual speakers 92.

In addition, the above sound processing apparatus 10A outputs a predicted listening sound of a stereo type, by using a stereo speaker. In such a case, the sound processing apparatus is configured to be connected to a plurality of speakers, and the sound processing apparatus, by adjusting a phase and amplitude of the predicted listening sound signal to be outputted to each of the plurality of speakers, according to the position of the plurality of speakers, is able to achieve acoustic image localization. As a result, the user can listen to the predicted listening sound from the virtual speaker 92 placed in the desired position in the space, with a much more realistic sensation.

In addition, the above sound processing apparatus 10A sets a listening position by designation using the operation input device 74. However, the sound processing apparatus 10A, by giving a position detection function to the camera 75, is able to set a position of the camera 75, that is, an image capturing position, to the listening position. As a result, the user can set the position of the camera 75, that is, a position of the user, to the listening position, without bothering to set the listening position. Therefore, the user can easily listen to the predicted listening sound at the image capturing position.

In addition, the sound processing apparatus 10A outputs a composite image, and emits a predicted listening sound. However, the sound processing apparatus 10A, if only emitting the predicted listening sound, is able to omit the image obtainer 11, the plane setter 12, the sound pressure distribution calculator 14, and the composite image generator 15.

(Sound Processing Method (Method of Generating Predicted Listening Sound))

Figure 9:
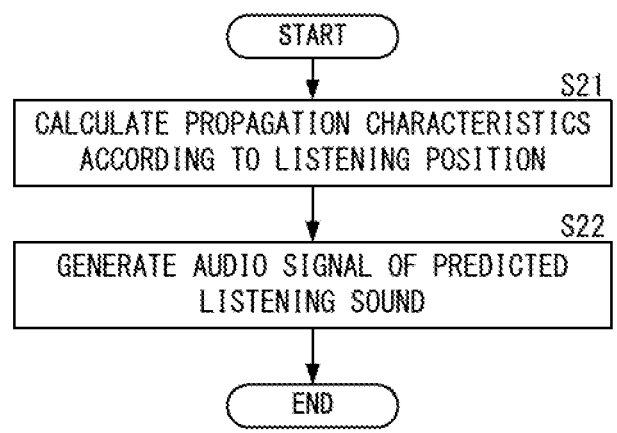
FIG. 9 is a flow chart showing how to generate the predicted listening sound.
Figure 10:
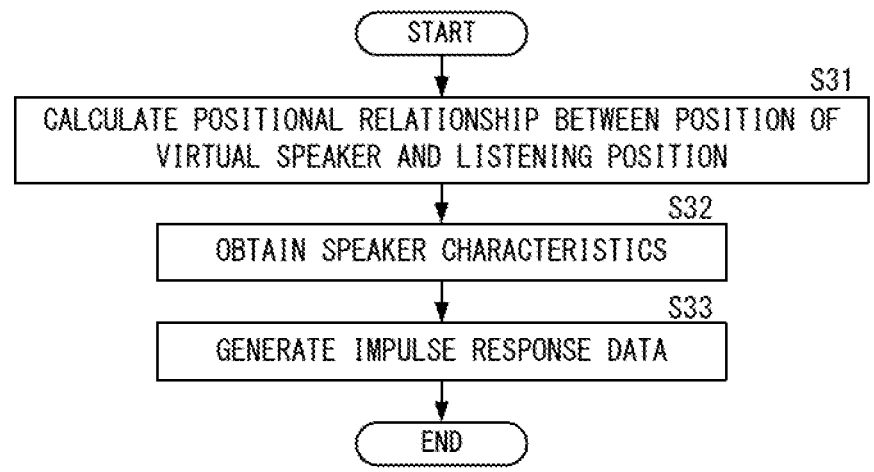
FIG. 10 is a flow chart showing how to calculate propagation characteristics shown in FIG. 9.
Figure 11:
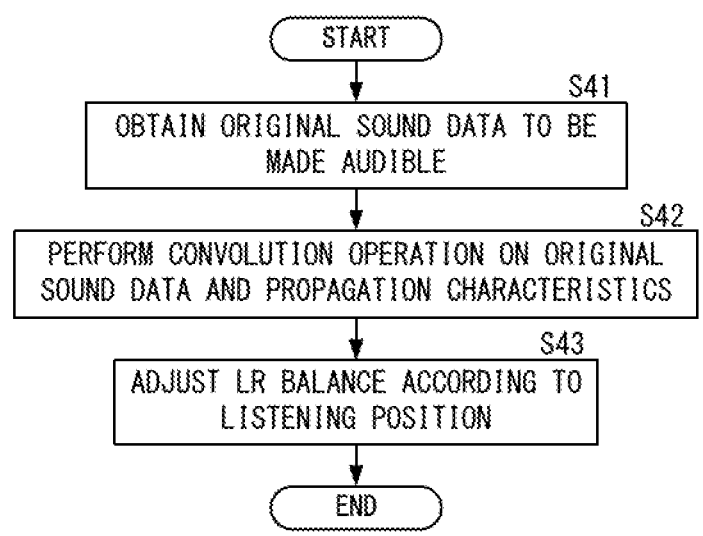
FIG. 11 is a flow chart showing how to generate an audio signal shown in FIG. 9.

In the above description, the method of generating a predicted listening sound is achieved by a plurality of functional parts. However, the arithmetic device 70 such as the above computer, in a case of executing a program and generating a predicted listening sound, may schematically execute processing shown in the flow chart of FIG. 9, FIG. 10, and FIG. 11. FIG. 9 is a flow chart showing how to generate the predicted listening sound. FIG. 10 is a flow chart showing how to calculate propagation characteristics shown in FIG. 9. FIG. 11 is a flow chart showing how to generate an audio signal shown in FIG. 9. It is to be noted that, since the specific content of each processing is described above, only a schematic flow will be described herein.

The arithmetic device 70 obtains a listening position and calculates propagation characteristics (impulse response data of a listening position) of a sound according to the listening position (S21). More specifically, as shown in FIG. 10, the arithmetic device 70 calculates a positional relationship between the position P92 of the virtual speaker 92 and the listening position (S31). The arithmetic device 70 obtains speaker characteristics (S32). The arithmetic device 70 generates the propagation characteristics (the impulse response data of the listening position) of a sound, by using the positional relationship between the position P92 of the virtual speaker 92 and the listening position, and the speaker characteristics (S33).

The arithmetic device 70 generates an audio signal of a predicted listening sound, by using the propagation characteristics of the sound at the listening position, and the original sound data to be emitted as a sound (S22). More specifically, as shown in FIG. 11, the arithmetic device 70 obtains original sound data to be made audible (S41). The arithmetic device 70 performs convolution operation of the propagation characteristics, that is, the impulse response data to the listening position and the original sound data (S42). The arithmetic device 70 adjusts an LR balance according to the listening position (S43).

Such processing is performed, so that the user can virtually listen to a sound from a desired speaker placed in a desired position in a space, as if being present in such a space without actually placing the desired speaker.

Furthermore, the user can listen to a listening sound from the virtual speaker 92, by a stereo sound of which the LR balance is adjusted. As a result, the user can listen to the predicted listening sound from the virtual speaker 92 placed in a desired position in a space, with a more realistic sensation.

It is to be noted that, when sound reproduction in consideration of the head-related transfer function by a headphone speaker is used instead of the processing of the step S43 described above, more accurate acoustic image localization is able to be achieved. As a result, reproducibility of the listening sound from the virtual speaker 92 placed in the desired position in the space is further improved. Therefore, the user can listen to the listening sound from the virtual speaker 92, with a much more realistic sensation. In such a case, the headphone speaker corresponds to a "sound emitter" of the present disclosure.

The descriptions of the present embodiments are illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A sound processing method comprising:
   obtaining an image of an acoustic space;
   setting a plane in the acoustic space using the image;
   setting a virtual speaker in the image of the acoustic space;
   calculating sound pressure distribution to the plane using characteristics of the virtual speaker;
   generating a composite image by overlapping an image showing the sound pressure distribution and an image of the plane;
   setting a listening position in the image of the acoustic space;
   calculating propagation characteristics of a sound emitted from the virtual speaker to the listening position, corresponding to the sound pressure distribution;
   generating audio data at the listening position using the propagation characteristics of the sound and original sound data to be made audible;
   detecting an image capturing position at which the image is captured; and
   setting the image capturing position to be the same as the listening position.

2. The sound processing method according to claim 1, wherein the propagation characteristics of the sound is set by an impulse response of the virtual speaker and attenuation over distance from the virtual speaker to the listening position.

3. The sound processing method according to claim 1, further comprising emitting the sound by reproducing the audio data.

4. The sound processing method according to claim 1, further comprising displaying the composite image.

5. The sound processing method according to claim 1, further comprising setting at least one additional plane in the acoustic space.

6. The sound processing method according to claim 1, further comprising setting at least one additional virtual speaker in the acoustic space, wherein the sound pressure distribution is calculated by combining sound pressure distribution for each of the virtual speaker and the at least one additional virtual speaker.

7. The sound processing method according to claim 1, wherein the sound pressure distribution is calculated by sound pressure distribution of a direct sound from the virtual speaker.

8. The sound processing method according to claim 1, further comprising detecting the plane by analyzing a feature of the image, wherein the plane is set using a detection result.

9. A sound processing apparatus comprising:
   at least one processing device configured to:
   obtain an image of an acoustic space;
   set a plane in the acoustic space using the image;
   set a virtual speaker in the image of the acoustic space;
   calculate sound pressure distribution to the plane using characteristics of the virtual speaker;
   generate a composite image by overlapping an image showing the sound pressure distribution and an image of the plane;
   set a listening position in the image of the acoustic space;
   calculate propagation characteristics of a sound emitted from the virtual speaker to the listening position, corresponding to the sound pressure distribution;
   generate audio data at the listening position using the propagation characteristics of the sound and original sound data to be made audible; and
   detect an image capturing position at which the image is captured, and set the image capturing position to be the same as the listening position.

10. The sound processing apparatus according to claim 9, wherein the at least one processing device is configured to set the propagation characteristics of the sound by an impulse response of the virtual speaker and attenuation over distance from the virtual speaker to the listening position.

11. The sound processing apparatus according to claim 9, further comprising a display configured to display the composite image.

12. The sound processing apparatus according to claim 9, wherein the at least one processing device is configured to set at least one additional plane in the acoustic space.

13. The sound processing apparatus according to claim 9, wherein the at least one processing device is further configured to:
   set at least one additional virtual speaker in the acoustic space; and
   calculate the sound pressure distribution by combining sound pressure distribution for each of the virtual speaker and the at least one additional virtual speaker.

14. The sound processing apparatus according to claim 9, wherein the at least one processing device is configured to calculate the sound pressure distribution by sound pressure distribution of a direct sound from the virtual speaker.

15. The sound processing apparatus according to claim 9, wherein the at least one processing device is configured to detect the plane by analyzing a feature of the image, and set the plane by using a detection result.

16. A non-transitory computer-readable storage medium storing a sound processing program causing an arithmetic device to execute a process comprising:
   obtaining an image of an acoustic space;
   setting a plane in the acoustic space using the image;
   setting a virtual speaker in the image of the acoustic space;
   calculating sound pressure distribution to the plane using characteristics of the virtual speaker; and
   generating a composite image by overlapping an image showing the sound pressure distribution and an image of the plane;
   setting a listening position in the image of the acoustic space;
   calculating propagation characteristics of a sound emitted from the virtual speaker to the listening position, corresponding to the sound pressure distribution;
   generating audio data at the listening position using the propagation characteristics of the sound and original sound data to be made audible;
   detecting an image capturing position at which the image is captured; and
   setting the image capturing position to be the same as the listening position.

* * * * *